Patented Apr. 28, 1942

2,281,014

UNITED STATES PATENT OFFICE 2,281,014

AMINOARYLSULPHONAMIDO-PYRAZOLONES

Philip Stanley Winnek, Stamford, Conn., assignor to American Cyanamid Company, New York, N. Y., a corporation of Maine No Drawing. Application June 8, 1939,
Serial No. 278,075

6 Claims. (Cl. 260—310)

This invention relates to aminoarylsulphonamidopyrazolones and methods of preparing them.

The compounds of the present invention have the following general formula:

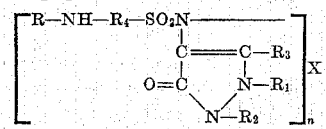

in which R may be hydrogen or a solubilizing group such as sodium methylene sulphinate ($-CH_2SO_2Na$), $R_1$ and $R_2$ may be hydrogen, alkyl or aryl radicals, $R_3$ is hydrogen or an alkyl radical, $R_4$ is a mononuclear aryl radical, X may be hydrogen, a metal or an ammonium radical and $n$ is a small whole number.

The products of the present invention are useful as azo dye intermediates.

The preferred embodiments of the present invention are those having the following general formula:

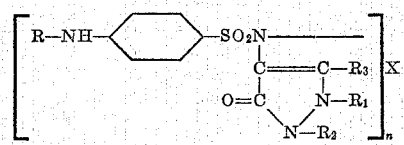

in which R may be hydrogen or a solubilizing group such as sodium methylene sulphinate, $R_1$ and $R_2$ may be hydrogen, alkyl or aryl radicals, $R_3$ may be hydrogen or alkyl, X may be hydrogen, a metal or an ammonium radical and $n$ is a small whole number.

Good yields of the preferred compounds of the present invention may be obtained by reacting a 4-aminopyrazolone with p-acylaminobenzene sulphonyl chloride. The invention is, however, not limited to this particular process and others may be used. For example, it is also possible to react a 4-aminopyrazolone with p-nitrobenzene sulphonyl chloride followed by reduction of the nitro group. In both cases, the compounds obtained may be modified by effecting a substitution of one of the hydrogen atoms of the amino group, for example, by the methylene sulphinate radical.

The ortho and meta derivatives may be prepared by the second method of the preceding paragraph and these compounds may be modified as in the case of the preferred compounds by substitution of one of the hydrogens of the amino group.

The alkali metal salts of the aminoarylsulphonamidopyrazolones of the present invention may be prepared by reacting the appropriate pyrazolone compound with an alkali metal hydroxide and throwing out the alkali metal salt by adding excess solid alkali metal hydroxide to the solution. The salts so obtained may be recrystallized from aqueous alcohol.

If, however, salts of the heavier metals such as for example copper, gold, lead or iron are desired, they may best be prepared by reacting an alkali metal salt, preferably in aqueous solution, with a suitable soluble salt of the metal whose aminoarylsulphonamidopyrazolone salt is desired. Double decomposition takes place and the desired product is obtained, usually as a precipitate.

The invention will be described in greater detail in conjunction with the following specific examples which are typical illustrations of the invention but do not limit its scope to the details therein set forth. Parts are by weight except in the case of liquids where they are by the corresponding volumes.

Example 1

2-(p-aminobenzenesulphonamido)-antipyrine

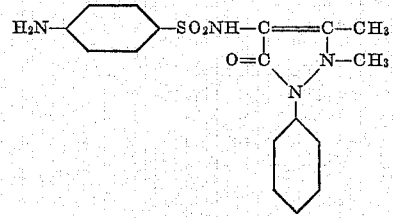

40 parts (0.2 mol) of 4-aminoantipyrine (1-phenyl-2,3-dimethyl-4-amino-5-pyrazolone) were dissolved in 50 parts of anhydrous pyridine. The solution was vigorously stirred and 60 parts (0.25 mol) of p-acetylaminobenzene sulphonyl chloride were added at such a rate that the temperature was kept between 50°–65° C. It was then heated at 125°–130° C. and 13 parts of sodium hydroxide dissolved in 65 parts of water were added slowly. Heating and stirring were continued and hot water added to maintain the volume until all of the pyridine had been distilled off. The pH was adjusted to 7 and the precipitate which had formed was collected on a Büchner funnel and washed with water. A yield of 80 parts (moist) of the crude acetyl derivative was obtained.

Deacylation was accomplished by boiling with 6N hydrochloric acid for one hour. The resulting solution was then diluted with two volumes of water, decolorizing carbon was added and the mixture boiled for a half hour. It was filtered hot and on neutralizing the cooled filtrate with dilute sodium hydroxide, the 4-(p-aminobenzenesulfonamido)-antipyrene separated. It was purified by reprecipitation from dilute hydrochloric acid and repeated crystallization from 50% ethanol. It was a pure white crystalline material. The yield obtained was 28 parts.

Example 2

4-(p - aminobenzenesulphonamido)-2-phenyl-3-methyl-5-pyrazolone

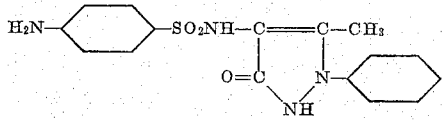

37.8 parts (0.2 mol) of 2-phenyl-3-methyl-4-amino-5-pyrazolone were reacted with 60 parts (0.25 mol) of p-acetylaminobenzene sulphonyl chloride using 50 parts of anhydrous pyridine as a solvent in a manner similar to that described in Example 1. After adding 13 parts of sodium hydroxide dissolved in 65 parts of water, the pyridine was distilled off, the reaction mixture was cooled and the crude acetyl derivative collected on a Büchner funnel. It was deacetylated by boiling for 1 hour in 6N hydrochloric acid. The resulting solution was then diluted with two volumes of water, decolorizing carbon was added and the mixture boiled for a half hour. It was filtered hot and on neutralizing the cooled filtrate with dilute sodium hydroxide, the 4-(p-aminobenzenesulphonamido) - 2 - phenyl - 3 - methyl-5-pyrazolone separated. It was purified by reprecipitation from dilute hydrochloric acid and repeated crystallization from 50% ethanol. The product was a white crystalline material. The yield obtained was 22 parts.

Example 3

4-(p-aminobenzenesulphonamido) - 1 - phenyl-2-ethyl-3-methyl-5-pyrazolone

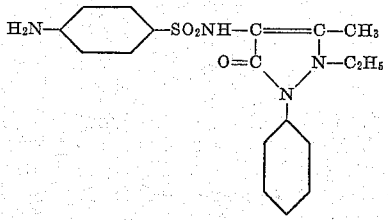

43.4 parts (0.2 mol) of 1-phenyl-2-ethyl-3-methyl-4-amino-5-pyrazolone were suspended in 50 parts of anhydrous pyridine and 55.4 parts (0.25 mol) of p-nitrobenzene sulphonyl chloride were added at such a rate that the temperature did not rise above 60° C. The reaction flask was heated on a steam bath for 1 hour and then 13 parts of sodium hydroxide dissolved in 65 parts of water were added slowly. A yellowish brown precipitate formed. The pyridine was distilled off under reduced pressure, water being added from time to time. The nitro derivative which had been formed was collected on a Büchner funnel, washed with water, and recrystallized from acetic acid. The yield obtained was 48 parts of a yellow crystalline material.

This product was reduced by adding it to a suspension of 80 parts of iron powder in 800 parts of water containing 1.0 part of glacial acetic acid heated to 70°-80° C. The reaction mixture was heated and stirred for 3 hours. It was then cooled and neutralized by adding a small amount of sodium bicarbonate. The mixture was filtered and the solid cake extracted three times with hot ethanol. On cooling the extracts, crude 4-(p-aminobenzenesulphonamido)-1-phenyl-2-ethyl-3-methyl-5-pyrazolone crystallized. Additional product was obtained by diluting the alcoholic mother liquor with water. The material was purified by recrystallization from 50% ethanol. It was a white crystalline product. The yield obtained was 15 parts.

Example 4

4-(o-aminobenzenesulphonamido)-1-phenyl-2-ethyl-3-methyl-5-pyrazolone and 4-(m-aminobenzenesulphonamido)-1-phenyl - 2 - ethyl-3-methyl-5-pyrazolone may be prepared according to the procedure of Example 3, substituting equivalent quantities of o- and m-nitrobenzene sulphonyl chloride, respectively, for the p-nitrobenzene sulphonyl chloride.

Example 5

1-methyl-2-(p-aminobenzenesulphonamido-p'-phenyl)-3-methyl-4-(p - aminobenzenesulphonamido)-5-pyrazolone

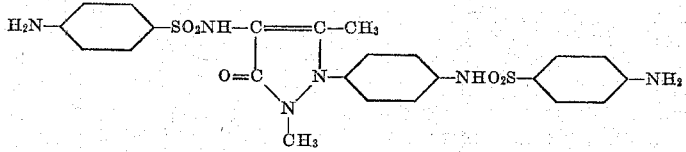

21.8 parts (0.1 mol) of 1-methyl-2-(p-aminophenyl) - 3 - methyl-4-amino-5-pyrazolone were suspended in 35 parts of dry pyridine, and 55.4 parts (0.25 mol) of p-nitrobenzene sulphonyl chloride were added at such a rate that the temperature did not rise above 60° C. The reaction flask was heated on a steam bath for 1 hour and the 13 parts of sodium hydroxide dissolved in 65 parts of water were added slowly. A yellowish brown precipitate formed and it was necessary to add more water to facilitate stirring. Heating on the steam bath and stirring was continued for 1 hour. Pyridine was then distilled off under reduced pressure, water being added from time to time. The reaction mixture was then cooled and the crude dinitro derivative filtered off. It was reduced to the 1-methyl-2-(p-aminobenzenesulphonamido - p' - phenyl) - 3-methyl-4-(p - aminobenzenesulphonamido) - 5-pyrazolone in a manner similar to that described in Example 3. The product was extracted from the solid cake with cellosolve and purified by recrystallization from a cellosolve-water mixture. The product was a white material, obtained in a yield of 12 parts.

Example 6

Sodium formaldehyde sulphoxylate derivative 4-(p-aminobenzenesulphonamido)-antipyrine

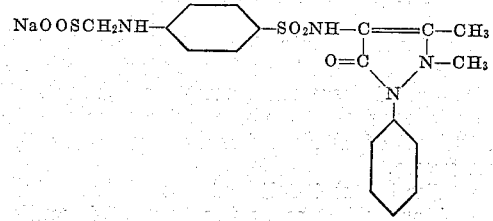

An intimate mixture of 3.6 parts (0.01 mol) of 4-(p-aminobenzenesulphonamido)-antipyrine with 2.0 parts (0.013 mol) of sodium formaldehyde sulphoxylate was added gradually with stirring to 7.5 parts of glacial acetic acid. After about a half hour a clear solution resulted which, when treated with dry ether, precipitated a viscous oil. The oil on scratching the beaker with a stirring rod was transformed into a white crystalline mass. The product was filtered off and washed well with dry ether. It was then dissolved in 7.5 parts of water and made just alkaline with sodium bicarbonate. Three volumes of alcohol were then added and the mixture cooled in an ice bath. The precipitate which formed was filtered off and the filtrate then treated with ether. A viscous lower layer formed. This layer was separated and placed in a vacuum desiccator over phosphoric anhydride. On standing, the sodium formaldehyde sulphoxylate derivative of 4-(p-aminobenzenesulphonamido)-antipyrine crystallized in the form of white needles which were extremely soluble in water and exhibited a faint alkaline reaction.

It will be noted that in the above examples p-acetylaminobenzene sulphonyl chloride has been used in very case where an acylaminobenzene sulphonyl chloride is called for. The invention is not intended to be limited to the use of the acetyl derivative which is used merely because of its relative cheapness and other acyl derivatives such as propionyl, butyryl, benzoyl and the like may also be used.

What I claim is:

1. Aminoarylsulphonamidopyrazolones having the following general formula:

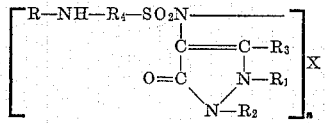

in which R is a member of the group consisting of hydrogen and solubilizing groups, $R_1$ and $R_2$ are members of the group consisting of hydrogen, alkyl and aryl radicals, $R_3$ is a member of the group consisting of hydrogen and alkyl radicals, $R_4$ is a mononuclear aryl radical, X is a member of the group consisting of hydrogen, metals and ammonium radicals and $n$ is a small whole number.

2. Sulphanilamidopyrazolones having the following general formula:

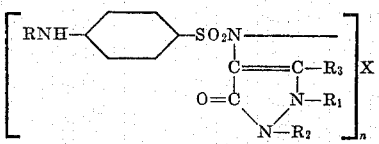

in which R is a member of the group consisting of hydrogen and solubilizing groups, $R_1$ and $R_2$ are members of the group consisting of hydrogen, alkyl and aryl radicals, X is a member of the group consisting of hydrogen, metals and ammonium radicals, $R_3$ is a member of the group consisting of hydrogen and alkyl radicals and $n$ is a small whole number.

3. Sulphanilamidopyrazolones having the following general formula:

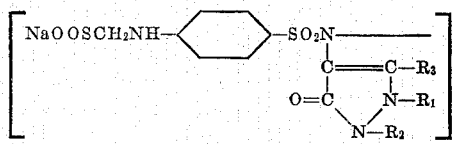

in which $R_1$ and $R_2$ are members of the group consisting of hydrogen, alkyl and aryl radicals, $R_3$ is a member of the group consisting of hydrogen and alkyl radicals, X is a member of the group consisting of hydrogen, metals, and ammonium radicals and $n$ is a small whole number.

4. 4-(p-aminobenzenesulphonamido)-antipyrine having the following formula:

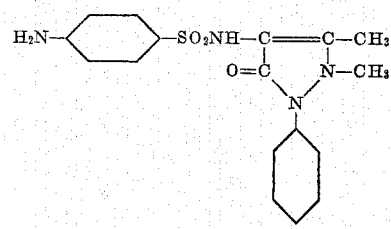

5. 4-(p-aminobenzenesulphonamido)-2-phenyl-3-methyl-5-pyrazolone having the following formula:

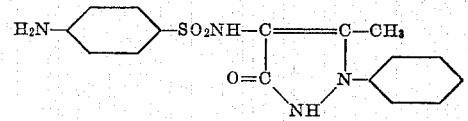

6. The sodium formaldehyde sulphoxylate derivative of 4-(p-aminobenzenesulphonamido)-antipyrine having the following formula:

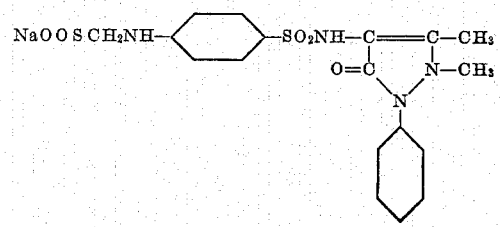

PHILIP STANLEY WINNEK.